United States Patent [19]

Olschewski et al.

[11] 4,440,401
[45] Apr. 3, 1984

[54] SEAL ASSEMBLY FOR BEARING CUPS SLIDABLE IN AXIAL DIRECTION IN BORE

[75] Inventors: Armin Olschewski; Gerhard Herrmann, both of Schweinfurt; Bernhard Bauer, Hassfurt, all of Fed. Rep. of Germany

[73] Assignee: SKF Kugellagerfabriken GmbH, Schweinfurt, Fed. Rep. of Germany

[21] Appl. No.: 494,435

[22] Filed: May 13, 1983

[30] Foreign Application Priority Data

May 15, 1982 [DE] Fed. Rep. of Germany ....... 8214245

[51] Int. Cl.³ .......................... F16J 15/32; F16J 15/38
[52] U.S. Cl. ................................. 277/50; 277/82; 277/84; 277/152; 277/166; 464/131
[58] Field of Search ...................... 277/50, 82, 84, 85, 277/87, 152, 166, 181, 186; 464/131

[56] References Cited

U.S. PATENT DOCUMENTS

| | | | |
|---|---|---|---|
| 1,569,751 | 1/1926 | Higgins | 277/82 X |
| 2,896,979 | 7/1959 | Stephens | 277/82 |
| 3,377,820 | 4/1968 | Smith | 464/131 |
| 3,658,395 | 4/1972 | Hallerback | 277/186 X |
| 4,106,781 | 8/1978 | Benjamin et al. | 277/82 |
| 4,154,490 | 5/1979 | Kohler et al. | 464/131 X |

*Primary Examiner*—Robert S. Ward
*Attorney, Agent, or Firm*—Eugene E. Renz, Jr.

[57] ABSTRACT

Sealing arrangement for bearing cups, in particular, for universal joints, consisting of a support body connected to the bearing cup and a seal ring which is fastened to a flange of the support body, characterized in that the support body (5, 23) has a relatively wide guide section (13) at the outside surface and is arranged limited slidable in axial direction in the bore of the bearing cup (1) and in that the seal ring (6) rests with a radially running face (17) against a shoulder (18) of the machine component (4) supported in the bearing cup (1).

7 Claims, 2 Drawing Figures

SEAL ASSEMBLY FOR BEARING CUPS SLIDABLE IN AXIAL DIRECTION IN BORE

BACKGROUND OF THE INVENTION

1. Field of the Invention

The present invention relates to a seal assembly for bearing cups of universal joints comprising a support body and a seal ring connected to a flange of the support body which seals the space between the bearing cup and the journal of the universal joint.

2. Description of the Prior Art

Prior seals of this general type are known and an example of such a seal is shown in German Preliminary application No. 2,313,091, which seal consists of an L-shaped annular body enclosing the bearing cup and a rubber lip seal which is mounted on the radially inwardly directed leg of the annular body. This prior known seal has the disadvantage that the sealing action changes for larger tolerances of the components to be sealed and in the assembled state, the spent lubricant, such as grease, during post lubrication can only be pressed with relative difficulty through a narrow gap between the seal ring and the journal of the universal joint.

SUMMARY OF THE INVENTION

With the foregoing in mind, it is an object of the present invention to provide a seal assembly particularly adapted for universal joints which is characterized by novel features of the construction and arrangement facilitating ease of assembly and providing a sealing action which is effective over a wide range of tolerances of the components of the universal joint. To this end, the seal assembly comprises a support body having a relatively wide guide section at its outer periphery which is arranged for limited sliding movement in an axial direction in the bore of the bearing cup and a seal ring having a radially extending sealing face which bears against a shoulder of the machine component such as a shoulder of the journal supported in the bearing cup. By reason of this construction, the seal ring conforms to the contact surface so that an optimum sealing action is attained at all times. More specifically, the bearing cup is provided with a radially inwardly directed peripheral projection or rib in the bore thereof which engages by a snap action with a relatively large axial tolerance in an annular groove formed in the outer peripheral surface of the body portion of the seal assembly so that the components are retained as a unit even in an unassembled condition prior to installation in a universal joint. The body portion includes a radially inwardly directed flange which seats in an annular groove in the seal ring in such a manner to provide a tolerance in a radial direction.

In accordance with another feature of the present invention, the axially extending section of the support body may be made relatively thin and a spring washer may be provided in the bore of the support body which provides tension radially outwardly to provide a good sealing engagement between the support body and the bearing cup.

In accordance with still another feature of the present invention, the flange of the support body is provided with a plurality of axially extending through ports or holes distributed circumferentially about the periphery thereof and the seal ring has a flange which normally overlies the seals or ports. During lubrication, however, the pressure of discharging spent lubricant displaces the sealing lip to allow spent lubricant to be discharged from the bearing space through the outlet ports or holes.

BRIEF DESCRIPTION OF THE DRAWINGS

These and other objects of the present invention and the various details of the operation and construction thereof are hereinafter more fully set forth with reference to the accompanying drawing, wherein.

BRIEF DESCRIPTION OF THE PREFERRED EMBODIMENTS

Figure 1:
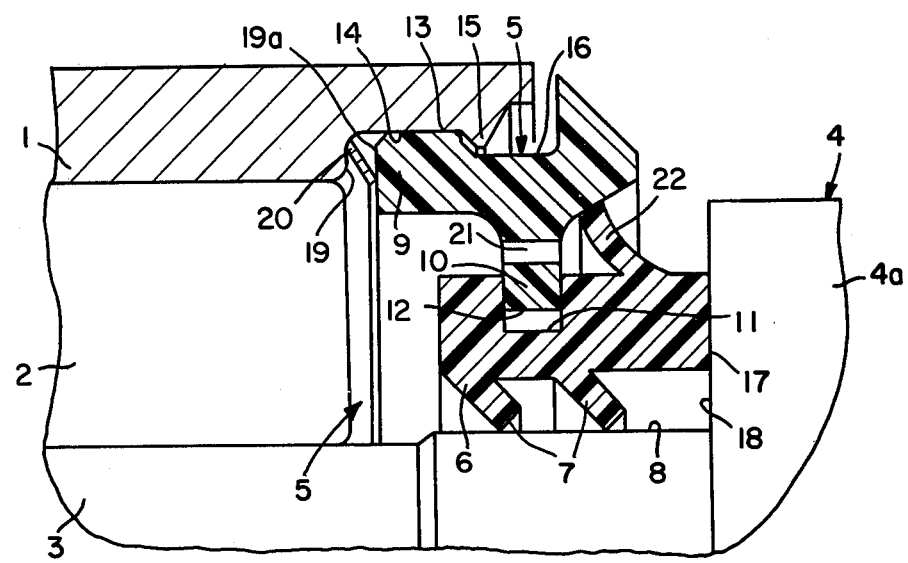
FIG. 1 is a fragmentary transverse sectional view through a bearing cup of a universal joint assembly showing the details of a seal assembly in accordance with the present invention.

Referring now to the drawing and particularly FIG. 1 thereof, there is shown a seal assembly in accordance with the present invention particularly adapted for sealing the bearing space S of a universal joint 4. The universal joint includes a bearing cup 1 of generally U-shaped cross section and a journal 3 rotatably supported in the bearing cup by a bearing comprising in the present instance a plurality of cylindrical rollers 2.

The seal assembly comprises an annular support body 5 connected to the bearing cup and a seal ring 6 in axial sealing contact with the spider 4a of the universal joint 4 and including in the present instance a pair of radially directed angularly disposed sealing lips 7 which engage a stepped shoulder 8 of the journal 3. The support body 5 comprises an annular ring portion 9 having a radially inwardly directed flange 10 which seats in an annular groove 11 formed in the outer peripheral surface of the seal ring 6. The bore 12 of the flange 10 is of a greater diameter than the base of the groove 11 of the seal ring 6 to provide a radial gap or clearance which allows free adjustment of the seal ring 6 in a radial direction. The support body 5 has a relatively wide guide section 13 which snugly engages in the bore surface 14 of the bearing cup providing a seal therebetween. The guide section 13 is a smaller axial width than the pocket 14 formed in the bearing cup to allow limited axial displacement of the support body 5 and the seal ring 6. Axial movement of the support body 5 is limited in one direction by a radially inwardly directed annular projection or rib 15 at one end of the bore of the bearing cup 1. This rib 15 snaps into the annular groove 16 formed in the outer peripheral surface of the body 5 during assembly of the support body 5 in the bearing cup. By this arrangement the slide path of the support body 5 is comparatively large so that manufacturing tolerances of the components of the universal joint are compensated for in a manner ensuring sealing engagement of the radial surface 17 of the seal ring against the shoulder 18 of the universal joint 4. The support body 5 and seal ring 6 are preferably made of a flexible resilient material such as plastic.

In order to increase the sealing action described above, a cup spring 20 or the like is mounted between the shoulder or front face 19 and the inner axial end face 19a of the support body 5. The cup spring presses the seal ring 6 more firmly against the shoulder 18.

The flange 10 of the support body is provided with several through holes or ports 21 circumferentially spaced about its periphery and the seal ring 6 has an elastic sealing lip 22 which engages the support body above the ports or holes 21. The lip 22 is normally in positive contact with the support body. However, during post lubrication of the assembly, when additional new lubricant is introduced into the bearing space S, the spent lubricant is discharged through the ports or holes 21 and the lubricant pressure displaces the sealing lip 22 outwardly to facilitate discharge of the spent lubricant. During this post lubricating operation, the sealing surface 17 of the seal ring 6 is pressed more firmly against the surface 18 of the universal joint, thus preventing penetration of foreign matter into the bearing space. Of course, after the spent lubricant has been discharged, the normal bias of the seal 22 closes the gap and engages the support body 5 to provide a seal at that juncture. Lubricant may be injected into the bearing space S through a conventional bore or port arrangement in the trunnion of the universal joint or a bore in the bottom of the bearing cup.

Figure 2:
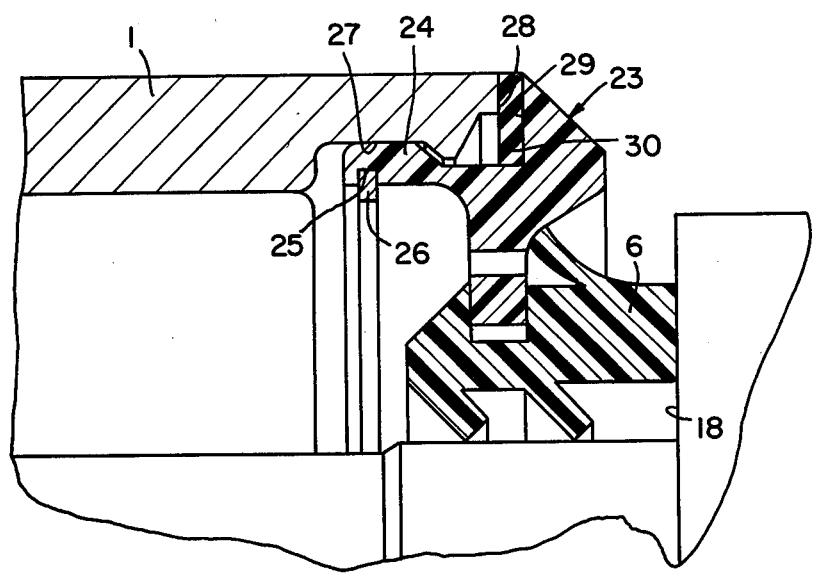
FIG. 2 is a fragmentary transverse sectional view showing a modified seal assembly in accordance with the present invention.

There is illustrated in FIG. 2 another embodiment of seal assembly in accordance with the present invention which is generally similar in overall construction to that described above. However, in this instance, the axially extending section 24 of the support body 23 is of relatively thin or narrow cross section and in order to firmly seat this section against the pocket in the bearing cup, a spring washer 26 engaging in a groove 25 of the axial section 24 is provided which presses this section more firmly against the bore surface 27 of the bearing cup. In accordance with this embodiment of the invention, a disc 30 made of an elastic material is mounted in the support body in a position confronting and engaging the axial end face 28 of the bearing cup. The disc 30 is made of an elastic material and functions as a seal and as an elastic element for axial adjustment of the seal ring 6 against the shoulder 18 of the universal joint.

While particular embodiments of the present invention have been illustrated and described herein, it is not intended to limit the invention and changes and modifications may be made therein within the scope of the following claims.

We claim:

1. Sealing arrangement for bearing cups, in particular, for universal joints, consisting of a support body connected to the bearing cup and a seal ring which is fastened to a flange of the support body, characterized in that the support body (5, 23) has a relatively wide guide section (13) at the outside surface and is arranged limited slidable in axial direction in the bore of the bearing cup (1) and in that the seal ring (6) rests with a radially running face (17) against a shoulder (18) of the machine component (4) supported in the bearing cup (1).

2. Sealing arrangement according to claim 1, characterized in that the bearing cup (1) has a radially inward directed peripheral projection (15) in the bore, which is arranged with a large axial tolerance in an annular groove (16) at the outside surface of the support body (5, 23).

3. Sealing arrangement according to claim 1, characterized in that a radial tolerance is provided between the bore (12) of a radially inward directed flange (10) which is connected to the support body (5, 23) and an annular groove (11) of the seal ring (6) which receives the flange (10).

4. Sealing arrangement according to claim 1, characterized in that the axially running section (24) of the support body (23) has a sight enlargement in radial direction and is provided in the bore with an annular groove (25) in which a spring washer (26) is arranged which provides tension radially outward.

5. Sealing arrangement according to claim 1, characterized in that the flange (10) of the support body (5, 23) has several axially running holes (21) distributed over the periphery.

6. Sealing arrangement according to claim 5, characterized in that the seal ring (6) is provided on the side of the outside surface facing away from the inner space of the bearing with a peripheral radially outward directed elastic lip (22) which axially rests against the support body (5, 23) above the hole (21).

7. Sealing arrangement according to claim 1, characterized in that a flexible disc (20, 30) or the like is provided between the front face (19, 28) of the bearing cup (1) and the front face (19a, 29) of the support body (5, 23).

* * * * *